US009999232B1

(12) United States Patent
Poland

(10) Patent No.: US 9,999,232 B1
(45) Date of Patent: Jun. 19, 2018

(54) GAMBREL

(71) Applicant: Lowell Poland, Grand Island, NE (US)

(72) Inventor: Lowell Poland, Grand Island, NE (US)

( * ) Notice: Subject to any disclaimer, the term of this patent is extended or adjusted under 35 U.S.C. 154(b) by 0 days. days.

(21) Appl. No.: 15/732,684

(22) Filed: Dec. 14, 2017

Related U.S. Application Data

(60) Provisional application No. 62/498,302, filed on Dec. 20, 2016.

(51) Int. Cl.
*A22B 7/00* (2006.01)
*A22B 5/06* (2006.01)

(52) U.S. Cl.
CPC .............. *A22B 7/002* (2013.01); *A22B 5/06* (2013.01)

(58) Field of Classification Search
CPC ................ A22B 7/00; A22B 7/002–7/004
USPC ........................................ 452/185, 188–192
See application file for complete search history.

(56) References Cited

U.S. PATENT DOCUMENTS

| | | | |
|---|---|---|---|
| 2,710,766 A | 10/1952 | Erlewine | |
| 3,188,130 A * | 6/1965 | Pietrowicz | A22B 5/06 224/921 |
| 4,763,942 A * | 8/1988 | Lyon | A22B 5/06 294/81.5 |
| 4,909,555 A | 3/1990 | Blasi | |
| 6,186,882 B1 * | 2/2001 | Adams | A22B 5/06 452/189 |
| 7,125,331 B1 * | 10/2006 | Sayers | A22B 5/06 452/189 |
| 7,341,506 B1 * | 3/2008 | Hogue | A22B 5/06 452/189 |
| 7,374,388 B2 * | 5/2008 | Holt | B60P 1/5471 212/180 |
| 9,247,754 B1 | 2/2016 | Rudd | |

OTHER PUBLICATIONS

Skin It Right cable gambrel from Skin It Rite, LLC, Alvin TX Youtube posted Jul. 13, 2013.
Xtendible Cinch Gambrel from Hawk Hunting, LLC, Frankenmuth MI Youtube posted Jan. 13, 2016.

* cited by examiner

*Primary Examiner* — Richard T Price, Jr.
(74) *Attorney, Agent, or Firm* — Timothy S. Stevens; Karen L. Kimble

(57) ABSTRACT

A gambrel for hanging an animal to be butcher or skinned, the gambrel having an adjustable length suspension bar from which lines extend to be wrapped around the legs of the animal to be butchered or skinned. The adjustable length suspension bar consists of one elongated member inserted into another elongated member. Each elongated member has a slot through which each end of a gambrel suspension line is extended into and retained within each elongated member so that the geometry of the gambrel suspension line remains the same when length of the adjustable length suspension bar is changed to accommodate different sized animals.

7 Claims, 5 Drawing Sheets

GAMBREL

BACKGROUND OF THE INVENTION

The instant invention relates to a gambrel. A gambrel is a rack-like device used, for example, by hunters to hoist and suspend a slain animal for field dressing. The gambrel holds the animal it in a suspended position, usually by the hind legs of the animal. A gambrel is often hung by a rope or chain from a fixed overhead object such as a tree branch. A winch system can be used to hoist heavy animals. Inventors have devised a wide variety of solutions to the problems involved with holding animals of various sizes and weights off the ground and suspending them for butchering, see for example U.S. Pat. Nos. 2,710,766; 4,909,555; 7,341,506; and 9,247,754. Despite the advances made in the art there remains a need for a simple portable device that is not only adjustable but also is adaptable for dressing almost any animal from ducks to large feral hogs.

SUMMARY OF THE INVENTION

The instant invention is the discovery of a gambrel that is not only adjustable but also is adaptable for dressing almost any animal from ducks to large feral hogs. In a general sense, the instant invention is a gambrel for hanging an animal to be butcher or skinned, the gambrel comprising an adjustable length suspension bar from which lines extend to be wrapped around the legs of the animal to be butchered or skinned. The adjustable length suspension bar consists of one elongated member inserted into another elongated member. Each elongated member has a slot through which each end of a gambrel suspension line is extended into and retained within each elongated member so that the geometry of the gambrel suspension line remains the same when length of the adjustable length suspension bar is changed to accommodate different sized animals.

More specifically the instant invention is a gambrel, comprising: (a) a first elongated member comprising a passageway thereinto along the longitudinal axis of the first elongated member, the first elongated member also comprising a slot therethrough into said passageway, said slot being along said longitudinal axis of the first elongated member, the first elongated member further comprising a first aperture therethrough into said passageway, said first aperture located near the entrance of said passageway opposite said slot; (b) a second elongated member comprising a passageway thereinto along the longitudinal axis of the second elongated member, the second elongated member also comprising a slot therethrough into said passageway, said slot being along said longitudinal axis of the second elongated member, the second elongated member further comprising a first aperture therethrough into said passageway, said first aperture located near the entrance of said passageway into said second elongated member opposite said slot, the second elongated member dimensioned to slide into the first passageway of the first elongated member; (c) a gambrel suspension line having a first end and a second end, the first end of the suspension line extending through the slot of the first elongated member to terminate within the passageway of the first elongated member with an end portion larger than the width of said slot, the second end of the suspension line extending through the slot of the second elongated member to terminate within the passageway of the second elongated member with an end portion larger than the width of said slot; (d) a first animal leg suspension line having a first end and a second end, the first end of the first animal leg suspension line extending through the first aperture of the first elongated member to terminate within the passageway of the first elongated member with an end portion larger than the diameter of said aperture, the second end of the first animal leg suspension line terminating with a hook; (e) a second animal leg suspension line having a first end and a second end, the first end of the second animal leg suspension line extending through the first aperture of the second elongated member to terminate within the passageway of the second elongated member with an end portion larger than the diameter of said first aperture, the second end of the second animal leg suspension line terminating with a hook. In a preferred embodiment, the gambrel further comprises: (f) a second aperture through said second elongated member said second aperture located near the end of said second elongated member opposite the end comprising said first aperture of said second elongated member; (g) a push button positioned to extend from within the passageway of the second elongated member through the second aperture of the second elongated member; and (h) a plurality of additional apertures through said first elongated member, said additional apertures arrayed to sequentially coincide with said push button as said second elongated member is slid into said first elongated member. The gambrel suspension line preferably comprises stainless steel wire cable, the first and second animal leg suspension lines preferably comprise stainless steel wire cable and the hooks of the first and second animal leg suspension lines are preferably stainless steel egg shaped snap hooks.

DETAILED DESCRIPTION OF THE INVENTION

Figure 1:
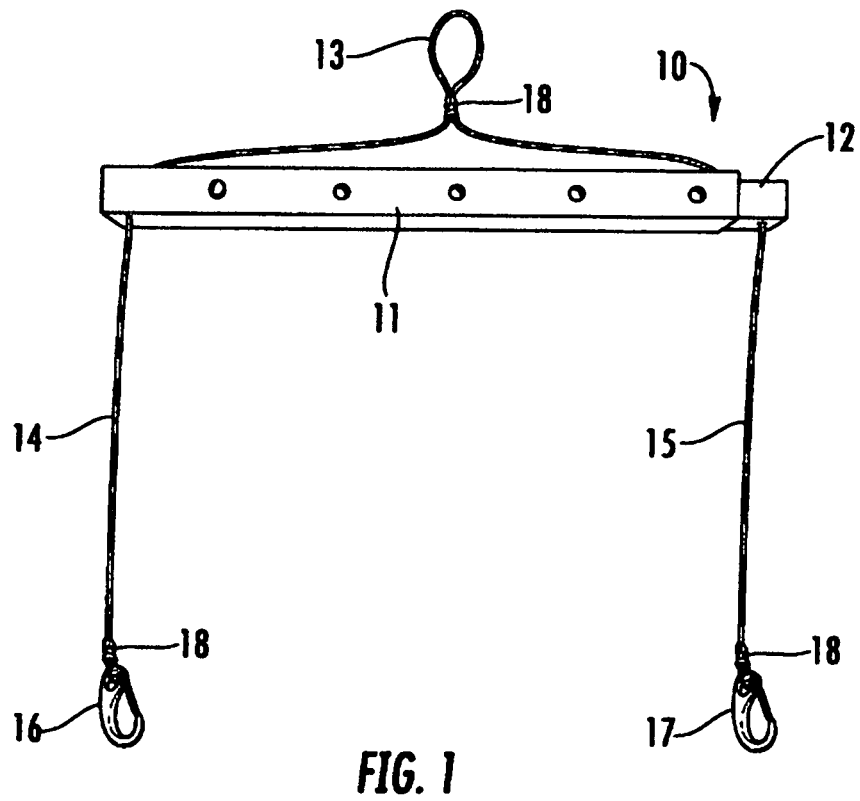
FIG. 1 depicts a side view of a highly preferred embodiment of the instant invention.

Referring now to FIG. 1, therein is shown a side view drawing of a highly preferred gambrel 10 of the instant invention comprised of adjustable length bar comprised of square painted aluminum tubing sections 11 and 12, bar suspension cable 13, first animal leg suspension cable 14, second animal leg suspension cable 15, first cable 14 having a first end and a second end, the first end of first cable 14 being attached near one end of the telescoping bar 11, the second end of first cable 14 being attached to first hook 16, second cable 15 having a first end and a second end, the first end of second cable 15 being attached near the other end of the telescoping bar 12, the second end of second cable 15 being attached to second hook 17. The adjustable length bar 11/12 of FIG. 1 is shown at its shortest adjusted length.

Figure 2:
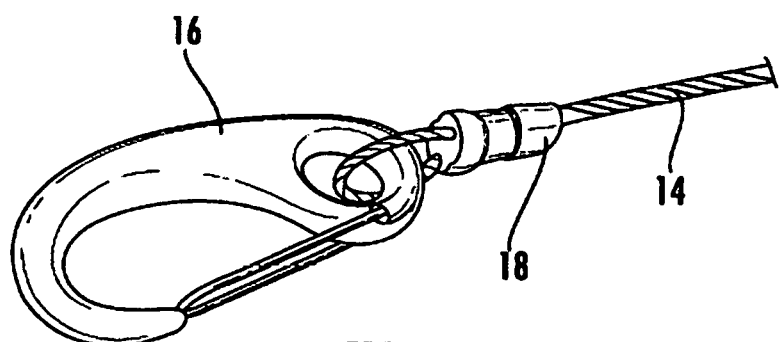
FIG. 2 depicts details of one of the hooks of the embodiment shown in FIG. 1.
Figure 3:
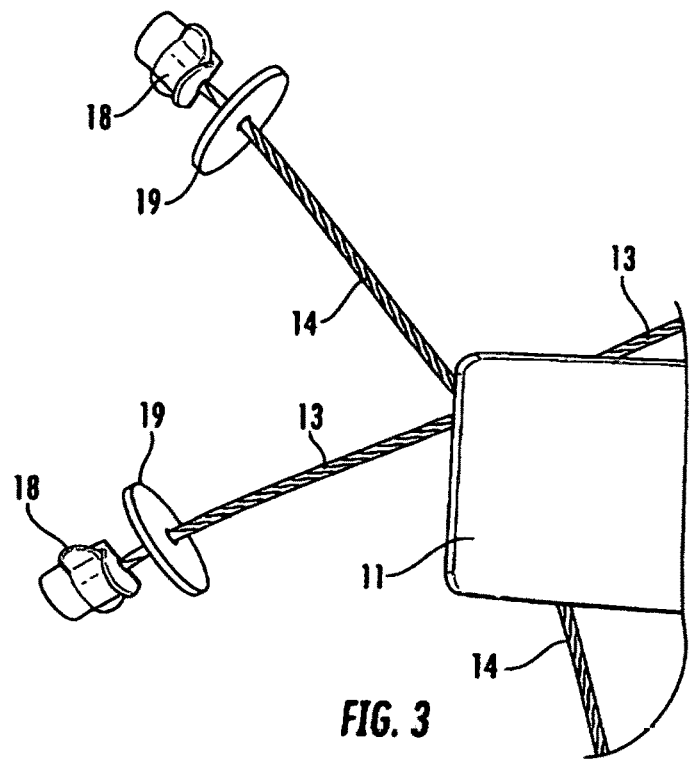
FIG. 3 depicts details of the ends of the cables of the embodiment shown in FIG. 1.
Figure 4:
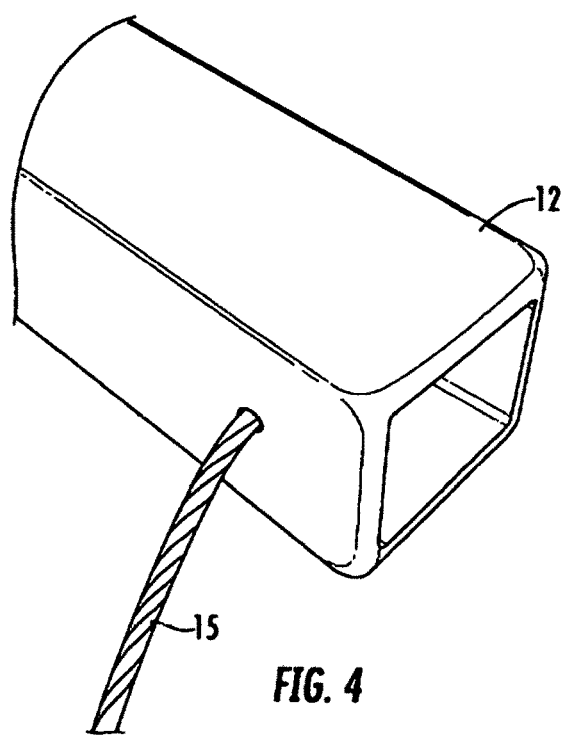
FIG. 4 depicts a detail of one the cables of the embodiment shown in FIG. 1.

Referring now to FIG. 2, therein is shown a perspective view of the detail of cable 14 attached to hook 16 by crimped ferrule 18. Referring now to FIG. 3, therein is shown a side view drawing of the detail of cables 13 and 14, bar section 11, crimped ferrules 18 and washers 19. In use, cable 14 is pulled back through an aperture in the bottom of bar section 11 while cable 13 is pulled back through a slot in the top of bar section 11 so that washers 19 and crimped ferrules 18 are pulled inside bar section 11. Referring now to FIG. 4, therein is shown a partial perspective end view of the detail of cable 15 emerging from the aperture in bar 12.

Figure 5:
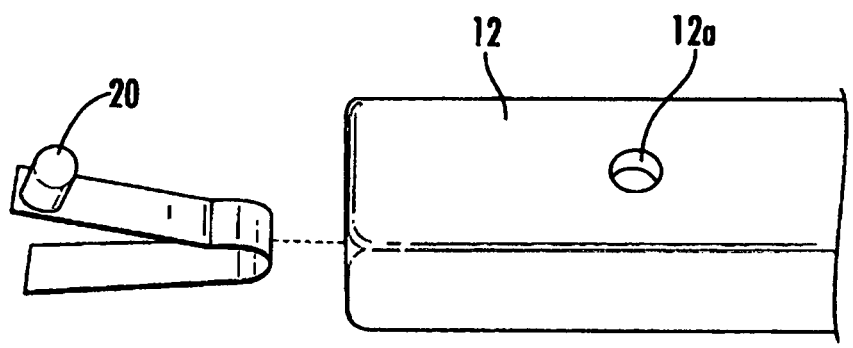
FIG. 5 depicts disassembled parts the embodiment shown in FIG. 1.
Figure 6:
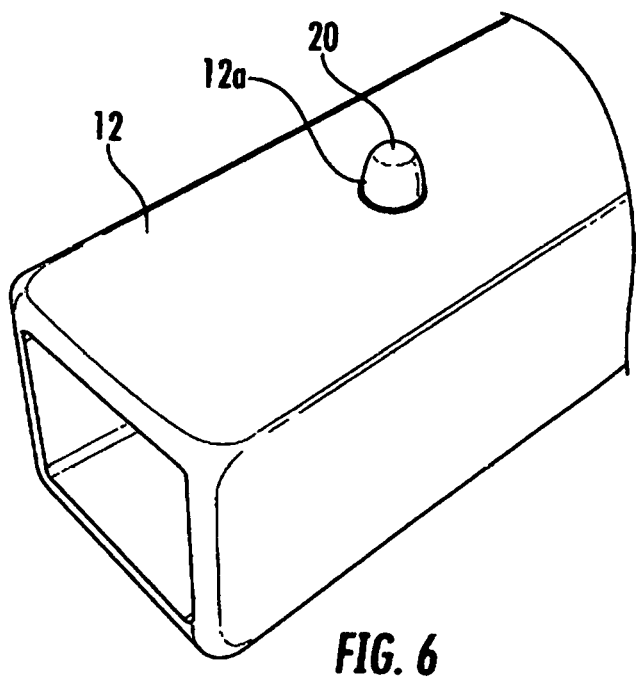
FIG. 6 depicts the parts of FIG. 5 as assembled.
Figure 7:
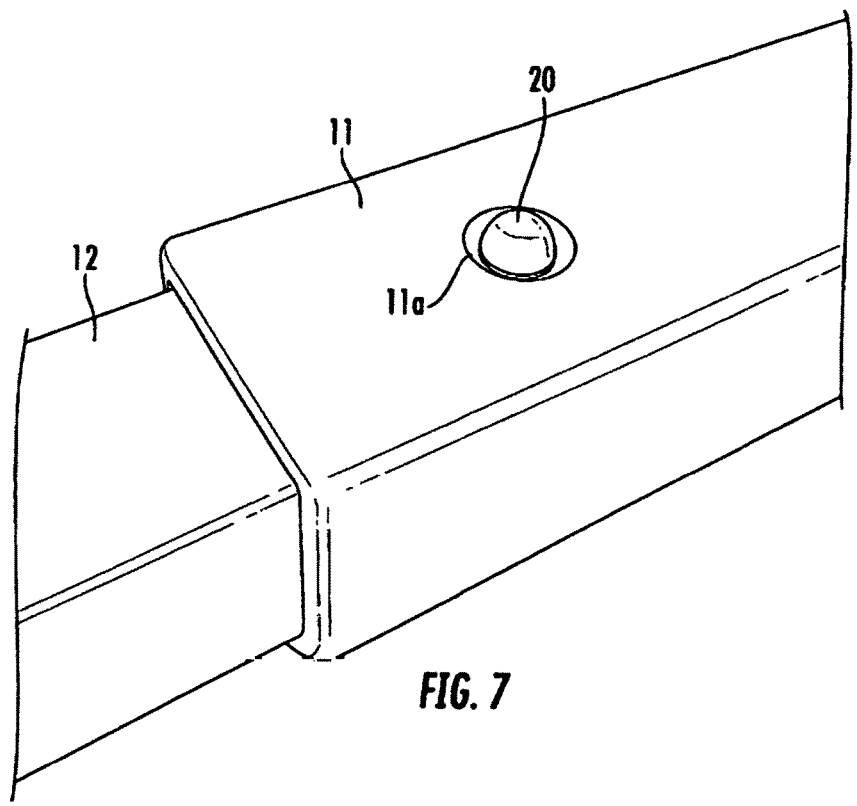
FIG. 7 depicts details of the bar length adjustment of the embodiment shown in FIG. 1.
Figure 8:
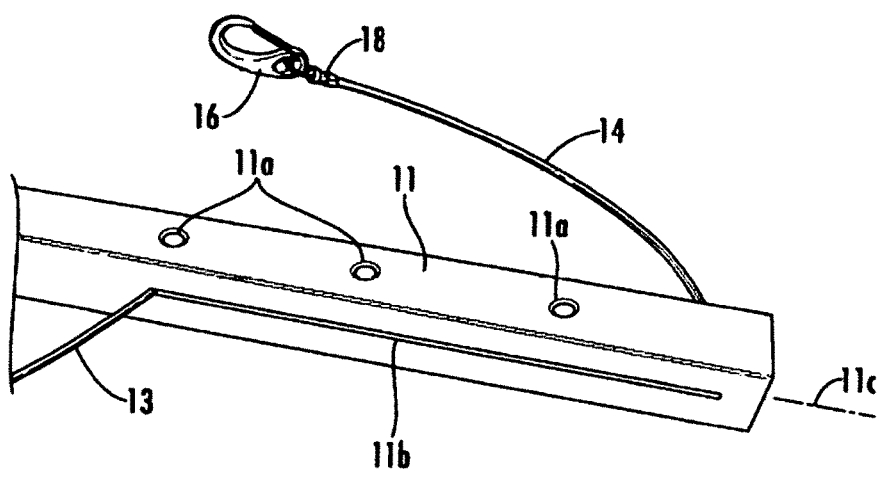
FIG. 8 depicts details of the top of one of the bars of the embodiment shown in FIG. 1.
Figure 9:
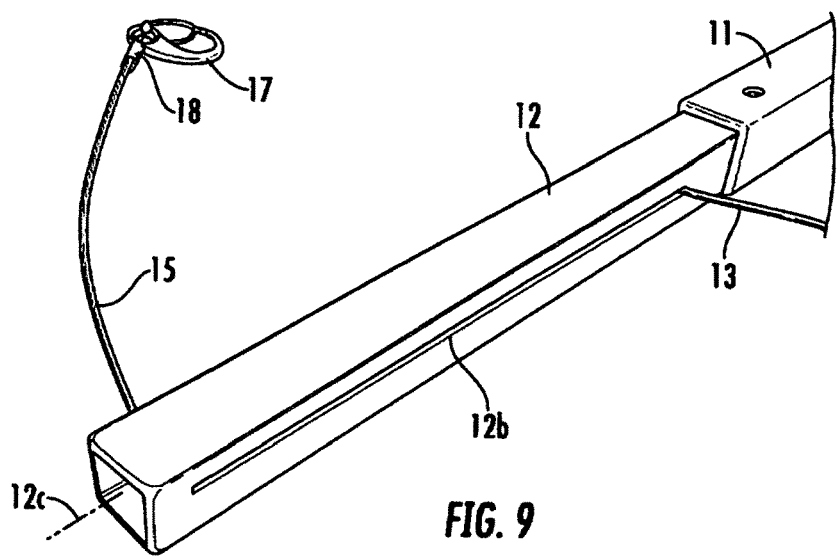
FIG. 9 depicts details of the top of the other bar of the embodiment shown in FIG. 1.
Figure 10:
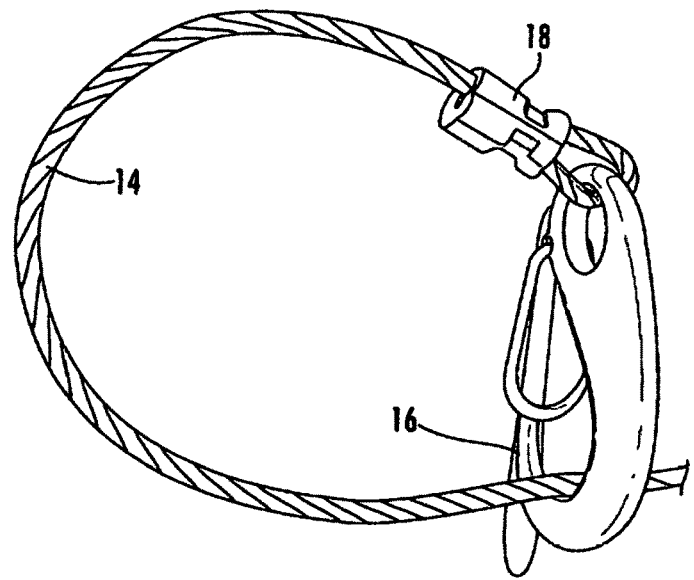
FIG. 10 depicts details of a cable to be wrapped around the leg of an animal.

Referring now to FIG. 5, therein is shown spring button 20 removed from bar section 12. Referring now to FIG. 6, therein is shown spring button 20 inserted into bar section 12 so that spring button 20 emerges through aperture 12a in bar section 12. Referring now to FIG. 7, therein is shown a partial perspective view of bar section 12 inserted into bar section 11 so that spring button 20 snaps into aperture 11a in bar section 11. Referring now to FIG. 8, therein is shown details of the top of bar section 11 including apertures 11a, slot 11b and longitudinal axis 11c. Apertures 11a and slot 11b are preferably chamfered on both sides. Referring now to FIG. 9, therein is shown details of the top of bar section 12 including slot 12b and longitudinal axis 12c. Slot 12b is preferably chamfered on both sides. Referring now to FIG. 10, therein is shown cable 14 to be wrapped around the leg of an animal and held in place by hook 16.

Referring again to FIG. 1 the length of adjustable length bar 11/12 is adjusted by pressing button 20 and pulling or pushing bar sections 11/12 to lengthen or shorten the bar length to correspond to the animal being butchered. Cables 14 and 15 are wrapped around the legs on the animal with the hooks 16 and 17 engaged as shown for cable 14 in FIG. 10. The weight of the suspended animal tightens the cables around the legs to securely suspend the animal during the butchering of the animal. An important benefit of the instant invention is the combination of the adjustable length bar with the legs of an animal secured by the cables wrapped around the legs of the animal and secured by the hooks. The heavier the animal, the more secure the cables hold the legs. However, even the legs of smaller animals such as ducks are securely held by the cables and hooks of the instant invention.

Referring again to FIGS. 8 and 9, the slots 11b and 12b in the top of the bar sections 11 and 12 provide an important benefit to the instant invention over prior art cable gambrels such as the SKIN-IT-RITE cable gambrel from Skin It Rite LLC, Alvin Tex. which does not provide an adjustable length bar or the XTENDIBLE CINCH GAMBREL from Hawk Hunting LLC, Frankenmuth Mich. which does provide an adjustable length bar but hangs the gambrel in a relatively unsteady single point manner from a central eyebolt. As the bar of the instant invention is lengthened or shortened in the instant invention, the ends of suspension cable 13 slide along slots 11b and 12b in cable sections 11 and 12 thereby maintaining a constant distance between the ends of the suspension cable at the bar and a steady balanced position for the adjustable length bar of the instant invention. Since suspension cable 13 is independent of leg holding cables 14 and 15, the length of cables 14 and 15 are maintained constant as the bar of the instant invention is lengthened or shortened.

The components of the instant invention can be made of any suitable material. However, it is preferable that the lines of the instant invention be stainless steel wire cables and the hooks be stainless steel egg shaped snap hooks. As stated above, bar sections 11 and 12 are preferably made from square aluminum tubing and coated with a durable paint finish. Bar section 11 for the gambrel shown in FIG. 1 is about 1.25×1.25 inch OD and about sixteen inches long. Bar section 12 for the gambrel shown in FIG. 1 is about 1×1 inch OD and about sixteen inches long.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

What is claimed is:

1. A gambrel, comprising: (a) a first elongated member comprising a passageway thereinto along the longitudinal axis of the first elongated member, the first elongated member also comprising a slot therethrough into said passageway, said slot being along said longitudinal axis of the first elongated member, the first elongated member further comprising a first aperture therethrough into said passageway, said first aperture located near the entrance of said passageway opposite said slot; (b) a second elongated member comprising a passageway thereinto along the longitudinal axis of the second elongated member, the second elongated member also comprising a slot therethrough into said passageway, said slot being along said longitudinal axis of the second elongated member, the second elongated member further comprising a first aperture therethrough into said passageway, said first aperture located near the entrance of said passageway into said second elongated member opposite said slot, the second elongated member dimensioned to slide into the first passageway of the first elongated member; (c) a gambrel suspension line having a first end and a second end, the first end of the suspension line extending through the slot of the first elongated member to terminate within the passageway of the first elongated member with an end portion larger than the width of said slot, the second end of the suspension line extending through the slot of the second elongated member to terminate within the passageway of the second elongated member with an end portion larger than the width of said slot; (d) a first animal leg suspension line having a first end and a second end, the first end of the first animal leg suspension line extending through the first aperture of the first elongated member to terminate within the passageway of the first elongated member with an end portion larger than the diameter of said aperture, the second end of the first animal leg suspension line terminating with a hook; (e) a second animal leg suspension line having a first end and a second end, the first end of the second animal leg suspension line extending through the first aperture of the second elongated member to terminate within the passageway of the second elongated member with an end portion larger than the diameter of said first aperture, the second end of the second animal leg suspension line terminating with a hook.

2. The gambrel of claim 1, further comprising: (f) a second aperture through said second elongated member said second aperture located near the end of said second elongated member opposite the end comprising said first aperture of said second elongated member; (g) a push button positioned to extend from within the passageway of the second elongated member through the second aperture of the second elongated member; and (h) a plurality of additional apertures through said first elongated member, said additional apertures arrayed to sequentially coincide with said push button as said second elongated member is slid into said first elongated member.

3. The gambrel of claim 1, wherein the gambrel suspension line comprises stainless steel wire cable, the first and second animal leg suspension lines comprise stainless steel wire cable and hooks of the first and second animal leg suspension lines are stainless steel egg shaped snap hooks.

4. The gambrel of claim 2, wherein the gambrel suspension line comprises stainless steel wire cable, the first and second animal leg suspension lines comprise stainless steel wire cable and hooks of the first and second animal leg suspension lines are stainless steel egg shaped snap hooks.

5. The gambrel of claim 4, wherein the central portion of the gambrel suspension line is formed into a loop by a crimped stainless steel ferrule.

6. A method for hanging an animal to be butchered by the steps of: (a) wrapping the second end of the first animal leg suspension line of the gambrel of claim 1 around one of the legs of an animal to be butchered so that the hook at the end of the first animal leg suspension line engages the first animal leg suspension line; and (b) wrapping the second end of the second animal leg suspension line of the gambrel of claim 1 around the other leg of the animal to be butchered so that the hook at the other end of the first animal leg suspension line engages the second animal leg suspension line.

7. A method for hanging an animal to be butchered by the steps of: (a) wrapping the second end of the first animal leg suspension line of the gambrel of claim 5 around one of the legs of an animal to be butchered so that the hook at the end of the first animal leg suspension line engages the first animal leg suspension line; and (b) wrapping the second end of the second animal leg suspension line of the gambrel of claim 1 around the other leg of the animal to be butchered so that the hook at the other end of the first animal leg suspension line engages the second animal leg suspension line.

\* \* \* \* \*